(12) United States Patent
Ji et al.

(10) Patent No.: US 8,379,164 B2
(45) Date of Patent: Feb. 19, 2013

(54) CASING STRUCTURE FOR ELECTRONIC DEVICES

(75) Inventors: Gang Ji, Kawasaki (JP); Tetsuya Ohtani, Yokohama (JP); Takayuki Morino, Yamato (JP); Akinori Uchino, Yamato (JP)

(73) Assignee: Lenovo (Singapore) Pte. Ltd, Singapore (SG)

( * ) Notice: Subject to any disclaimer, the term of this patent is extended or adjusted under 35 U.S.C. 154(b) by 795 days.

(21) Appl. No.: 12/351,586

(22) Filed: Jan. 9, 2009

(65) Prior Publication Data
US 2009/0185340 A1    Jul. 23, 2009

(30) Foreign Application Priority Data

Jan. 11, 2008  (JP) ................. 2008-004213

(51) Int. Cl.
G02F 1/1333 (2006.01)
H05K 7/00 (2006.01)
F21V 7/04 (2006.01)
H04N 5/64 (2006.01)

(52) U.S. Cl. ............... 349/58; 361/679.21; 361/800; 348/794; 348/836; 362/632; 362/633; 362/634

(58) Field of Classification Search ............ 349/58; 348/794, 836; 362/632–634; 361/679.21, 361/800
See application file for complete search history.

(56) References Cited

U.S. PATENT DOCUMENTS

| 5,867,370 A * | 2/1999 | Masuda ............ 361/800 |
| 2005/0237443 A1 * | 10/2005 | Nakanishi et al. ........ 349/58 |
| 2006/0232920 A1 * | 10/2006 | Miyamoto et al. ......... 361/683 |

FOREIGN PATENT DOCUMENTS

| JP | H08-150629 | 6/1996 |
| JP | H10-100193 | 4/1998 |
| JP | H10-215080 | 8/1998 |
| JP | 3059644 | 3/1999 |
| JP | H11-298158 | 10/1999 |
| JP | 2002-232220 | 8/2002 |
| JP | 2002-268063 | 9/2002 |
| JP | 2002-314262 | 10/2002 |
| JP | 2004-1424 | 1/2004 |
| JP | 2004-280331 | 10/2004 |
| JP | 2005-149463 | 6/2005 |
| JP | 2006-013797 | 1/2006 |
| JP | 2008-3714 | 1/2008 |

* cited by examiner

Primary Examiner — Nathanael R Briggs

(74) Attorney, Agent, or Firm — Ference & Associates LLC

(57) ABSTRACT

The invention provides a casing structure for an electronic apparatus that achieves a thin size and light weight. The casing structure is capable of accommodating a display module, and comprises a sidewall and a bottom surface in which a conductive resin region and a nonconductive resin region are butt joined in a curved line. The casing structure of the electronic apparatus does not become thick due to the butt joining even when the joint portions are in a projection area of the display module. Furthermore, on the display side of the casing structure, there is no need to have special frame members for securing strength in addition to the display casing. The display casing accommodates and protects the display module from an external pressing force and also has a design function that the outer surface of the casing resembles that of an outer surface of a conventional notebook PC.

19 Claims, 6 Drawing Sheets

CASING STRUCTURE FOR ELECTRONIC DEVICES

CLAIM OF PRIORITY

This application claims priority from Japanese Patent Application No. 2008-004213, filed on Jan. 11, 2008, and which is fully incorporated by reference as if set forth herein.

FIELD OF THE INVENTION

The present invention generally relates to a casing structure for an electronic apparatus.

BACKGROUND OF THE INVENTION

In recent years, a portable computer such as a notebook type personal computer (hereinafter, referred to as "notebook PC") has been standardized to have a radio communication antenna. The radio communication antenna is disposed on an upper surface or a side surface of a liquid crystal display so that the antenna exhibits the optimum sensitivity when users use the notebook PC. In order to cope with recent demands such as broad and multiple frequency bands, a high data transfer rate, or a diversity communication, the number of antennas mounted on a display-side casing of the notebook PC has been more and more increased.

Japanese Patent Application Laid-Open No. 2005-149463 discloses an electronic apparatus casing in which a resin member for covering a distal end part of a base member containing a fiber is bonded to the base member by means of adhesive while preventing the adhesive from running over a joint surface of the resin member and the base member, thus covering a hangnail of the fiber at the distal end part. Japanese Patent Application Laid-Open No. 11-298158 discloses an electronic apparatus casing configured by a metal plate and wall parts formed of a composite heat-curable resin material, for coping with multiple purposes of, such as, a light weight, an electromagnetic shielding property, or a transformation. The metal plate and the wall parts are joined with each other in corrugated joint surfaces.

With further progress in the trend toward thinner size and lighter weight notebook PCs, the structure of the display casing has been further evolved to cope with such progress. In a metallic display casing, the cutout portions for securing the antenna sensitivity have weak points in terms of strength while posing designing problems; hence, a display casing having a new structure is demanded. Therefore, a need has been recognized for an electronic apparatus, especially, such as a next-generation notebook PC, to have a display casing capable of achieving a thin size and light weight.

SUMMARY OF THE INVENTION

The present invention generally relates to a casing structure for an electronic apparatus capable of accommodating a display module, the casing structure comprising a sidewall and a bottom surface in which a conductive resin region and a nonconductive resin region are butt joined.

In accordance with at least one presently preferred embodiment of the invention, there is broadly contemplated herein a casing structure for an electronic apparatus which achieves a thin size and light weight.

In summary, one aspect of the invention provides an apparatus comprising a casing structure, said casing structure comprising: a sidewall; and a bottom surface, said bottom surface comprising: a conductive resin region end portion; and a nonconductive resin region end portion; wherein the conductive resin region end portion and the nonconductive resin region end portion are butt-joined to form a joint portion.

An additional aspect of the invention provides an apparatus comprising: a casing structure, said casing structure comprising: a display casing, the display casing comprising: a sidewall; a bottom surface, said bottom surface comprising: a conductive resin region; and a nonconductive resin region; wherein an end portion of the conductive resin region and an end portion of the nonconductive resin region are butt-joined to form a joint portion; and a display module.

A further aspect of the present invention provides a method comprising: fixing a laminated panel, which has been cut into a predetermined shape, to a mold, said laminated panel having an expanded layer disposed between layers made of carbon fiber reinforced plastic; and injection molding glass fiber reinforced plastic into the mold in which the laminated panel has been fixed; wherein a glass fiber reinforced plastic region and a carbon fiber reinforced plastic region are butt joined to form a bottom surface of a display casing; and wherein an antenna mounting space is formed in the glass fiber reinforced plastic region.

For a better understanding of the present invention, together and with other and further features and advantages thereof, reference is made to the following description, taken in conjunction with the accompanying drawings, and the scope of the invention will be pointed out in the appended claims.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the presently preferred embodiments of the present invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices that are consistent with the invention as claimed herein. The detailed description of the invention will briefly review some conventional arrangements and problems associated therewith in order to highlight some features of the instant invention (providing solutions to these problems). The description will then proceed with a more detailed description of preferred embodiments according to the present invention.

Referring now to the figures, the instant invention will be described with reference to the figures herein and the scope of the invention will be pointed out in the pending claims.

Figure 6:
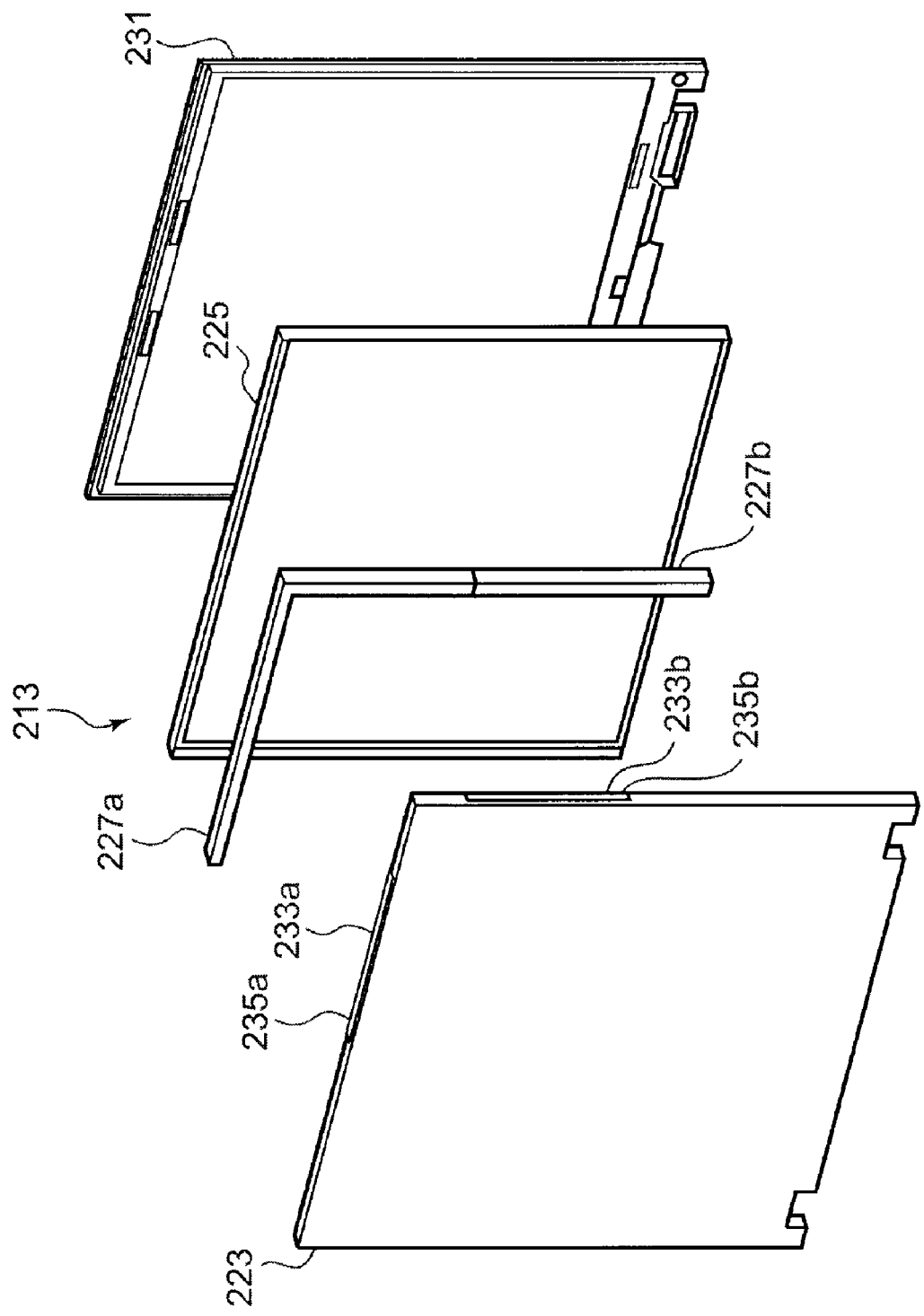
FIG. 6 is a perspective view for explaining a display casing and an LCD module.

FIG. 6 is a schematic perspective view illustrating a structure of a display portion 213 of a conventional notebook PC. The display portion 213 includes a display casing 223, a display module 225, antenna mounting portions 227a and 227b, and a bezel 231. A variety of types of radio communication antennas are mounted on the antenna mounting portions 227a and 227b. The display casing 223 has a box-like structure, and the display module 225 is fixedly accommodated therein. The antenna mounting portions 227a and 227b are disposed between a side portion of the display module 225 and an inner surface of the display casing 223. The bezel 231 is disposed on a front surface of the display module 225 to be mounted on the display casing 223.

The display casing 223 is a structure for protecting internal components of, for example, the display module 225 from an external pressing force. For this reason, the display casing 223 has usually been formed of a thick glass fiber reinforced plastic, but nowadays, in order to achieve a thin size and a light weight while maintaining strength of the casing, light metals such as aluminum alloys or magnesium alloys are often used.

When antennas mounted on the antenna mounting portions 227a and 227b are disposed inside the display casing 223 formed of a conductive material such as metal, the sensitivity may be lowered. For this reason, in the case of the display casing 223 formed of metal, a structure is typically used in which cutouts 233a and 233b are formed in parts of a side portion thereof corresponding to the antennas, and caps 235a and 235b configured by nonconductive members such as rubber or plastics are packed into the cutouts 233a and 233b.

However, when the cutouts 233a and 233b are formed in the display casing 223, the strength at these portions is inevitably lowered undesirably. For this reason, it is necessary to decide the structure of the display casing 223 with the presumption that the strength will be lowered by the cutouts 233a and 233b so that sufficient strength can be ensured. Particularly, when a plurality of antennas is mounted on one casing, the cutouts are required by the number of antennas mounted, so that it leads to a limit in achieving a thin size and lightweight in a metallic casing.

Furthermore, according to co-pending and commonly assigned Japanese Patent Application No. 2007-069947, a display casing is configured by a composite member including a decorative cover formed of a nonconductive material for contributing to designing function and a frame formed of metal for contributing to strengthening function. However, such a casing still poses problems in the form of increased number of members used or the weight thereof because of the metal used therein.

Therefore, according to at least one presently preferred embodiment of the present invention there is broadly contemplated herein a casing structure for an electronic apparatus, which achieves a thin size and a lightweight. The casing structure for an electronic apparatus is capable of accommodating a display module, the casing structure comprises a sidewall and a bottom surface in which a conductive resin region and a nonconductive resin region are butt joined. The joining portions for the butt joining depict a curved line in the bottom surface of the casing. The joint portions allow respective end portions of two regions to contact with each other while depicting a curved line so that the size of contacting areas can be increased more than contacting them in a straight line, thus reinforcing the joint portions. Moreover, it is possible to secure a space in the thickness direction of the casing by means of the butt joining, thus achieving a thin size.

The curved line may be configured to include a regular corrugated line. In such a case, a pitch of the conductive resin region may be made to be the same as a pitch of the nonconductive resin region. The conductive resin region may be configured to contain a carbon fiber reinforced plastic. In such a case, when the conductive resin region is formed by a laminated panel having an expanded layer between layers made of carbon fiber reinforced plastic, it is possible to obtain a conductive resin region having a light weight and high strength. Moreover, when the casing structure is formed by fixing the laminated panel cut into a predetermined shape to a metallic mold and then flowing the molten glass fiber reinforced plastic into the metallic mold, the molten glass fiber reinforced plastic may come into the expanded layer of the butt joint portions, so that it is possible to increase the strength of the joint portions.

Figure 1:
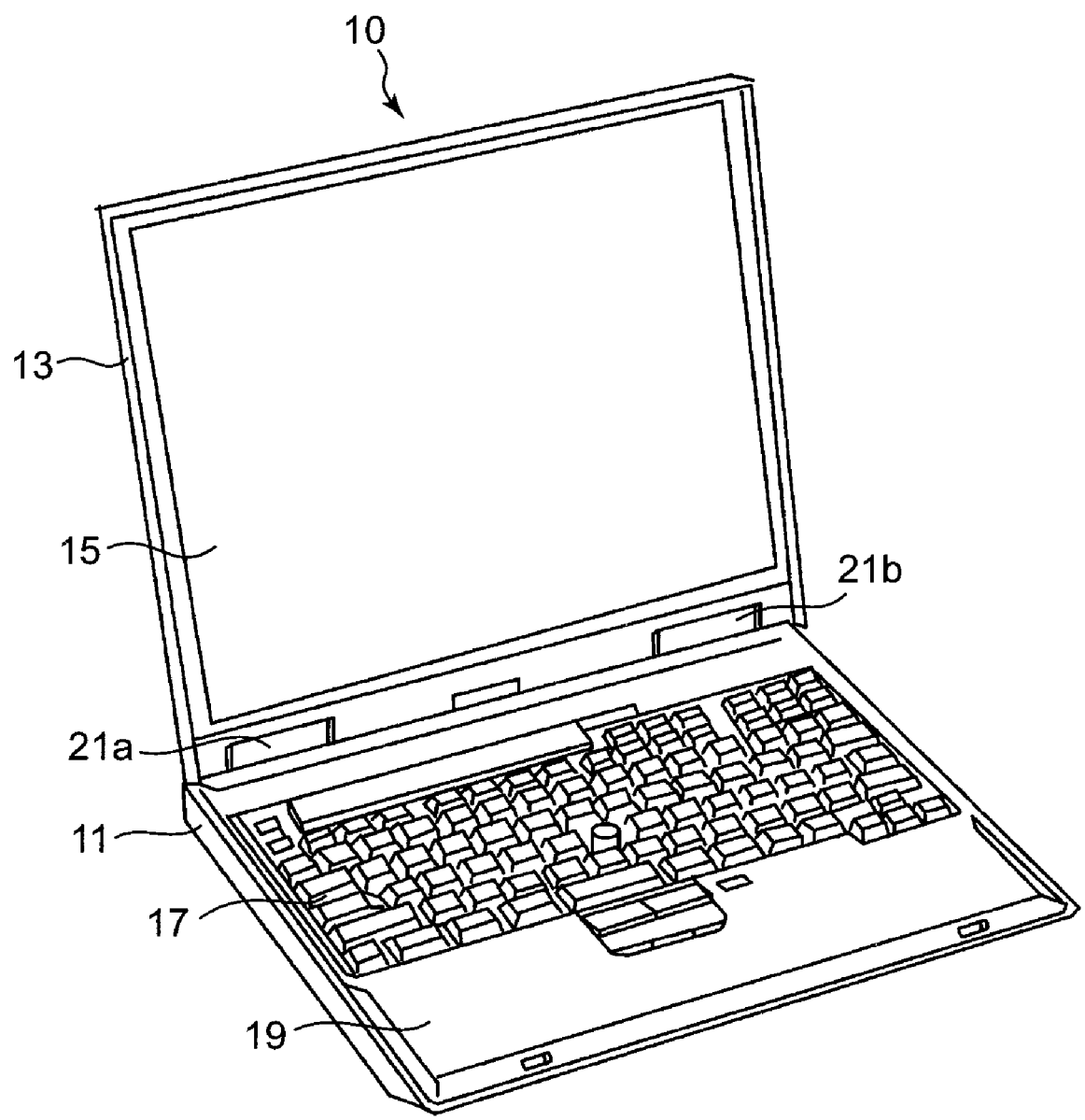
FIG. 1 is a perspective view illustrating an outer appearance of a notebook PC 10 according to an embodiment of the present invention.

When the sidewall and a peripheral portion of the bottom surface are formed of the nonconductive resin so that an antenna mounting space is provided in a space defined by the sidewall and the bottom surface, radio waves can be transmitted and received through the bottom surface and the sidewalls, so that it is possible to improve the antenna sensitivity. When the thickness of the antenna mounting space is made to be smaller than the thickness of the joint portions and the conductive resin region, a larger space can be provided to an antenna, so that it is possible to increase the degree of freedom in antenna design. Since the butt joint portions do not form a corrugated surface in the bottom surface even when they are in the projection area of the display module, it is possible to obtain a casing structure having a thin size FIG. 1 is a perspective view according to at least one embodiment of the present invention illustrating an outer appearance of a notebook PC 10. The notebook PC 10 has a liquid crystal display (LCD) module 15 accommodated in a display casing 13. A system casing 11 accommodates system devices such as a processor, a motherboard, a wireless module and a hard disk drive. A keyboard assembly 17 and a keyboard bezel 19 are mounted on an upper surface of the system casing 11. The system casing 11 and the display casing 13 are openably coupled to each other via hinge portions 21a and 21b.

Figure 2:
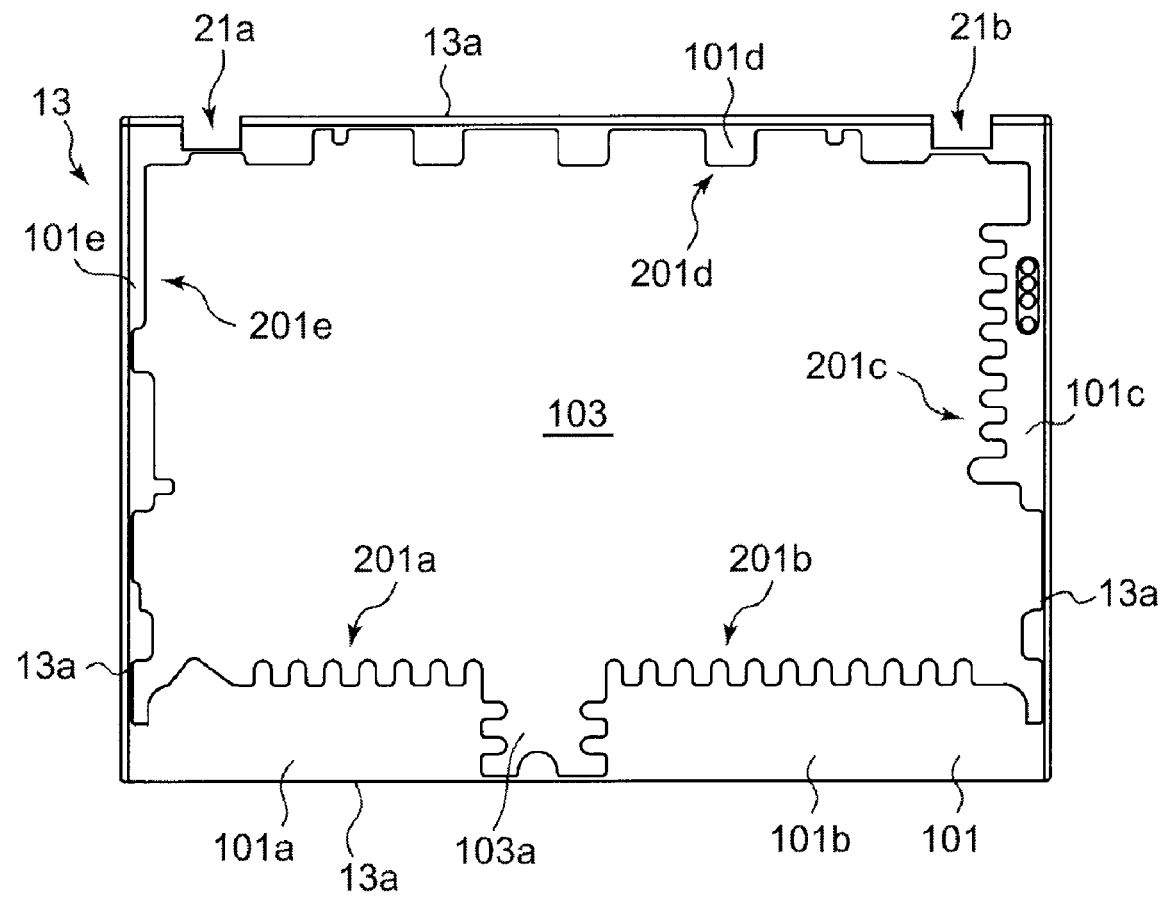
FIG. 2 is a top plan view illustrating an inner surface of a display casing in which an LCD module is accommodated.

FIG. 2 is a top plan view according to at least one embodiment of the present invention illustrating an inside of the display casing 13 in which the LCD module 15 is accommodated. The hinge portions 21a and 21b are positioned on the upper side of FIG. 2. The display casing 13 has strengthening function of accommodating the LCD module 15 and protecting the display module 15 from an external pressing force and also has designing function that an outer surface thereof constitutes an outer appearance of the notebook PC 10. Therefore, on a display side, there is no need to have a special frame member for securing strength in addition to the display casing 13.

The display casing 13 is formed by two regions: a glass fiber reinforced plastic (hereinafter, referred to as "GFRP") region 101 formed of a nonconductive material and a carbon fiber reinforced plastic (hereinafter, referred to as "CFRP") region 103 formed of a conductive material. The GFRP region 101 is disposed in a peripheral portion of the display casing 13 and constitutes sidewalls 13a for forming the inside into a box-like shape. In the GFRP region 101, antenna regions 101a and 101b, an indicator region 101c, and the other regions 101d and 101e are representatively depicted. The CFRP region 103 is disposed in the central part of the display casing 13 so as to occupy the whole area. The GFRP and the CFRP are both based on nylon.

The antenna regions 101a and 101b and the indicator region 101c are configured to extend toward the central part from the sidewalls 13a so that their boundaries 201a to 201c with the CFRP region 103 are formed into a regular waveform. The antenna regions 101a and 101b are used as spaces for mounting an antenna of, for example, a LAN or a WAN. The indicator region 101c is used as a space for mounting a light emitting diode as an indicator. Moreover, the CFRP region 103 includes a camera region 103a for mounting a camera.

Figure 3:
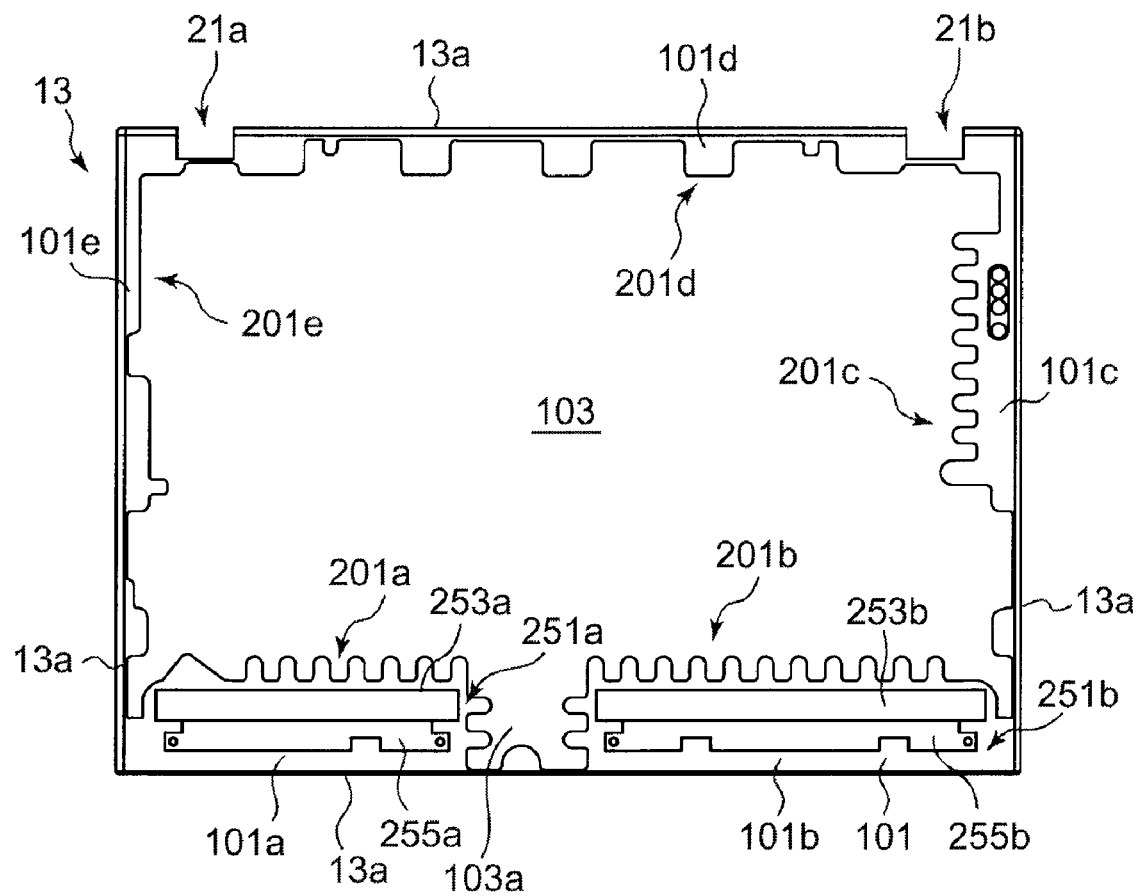
FIG. 3 is a top plan view illustrating a state where antennas are disposed in the display casing.

FIG. 3 is a top plan view according to at least one embodiment of the present invention illustrating a state where antennas 251a and 251b are arranged in the display casing 13. The antennas 251a and 251b are configured by radiation element portions 255a and 255b and ground sheets 253a and 253b, respectively. The antennas 251a and 251b are connected to a wireless module accommodated in the system casing 11. In the radiation element portions 255a and 255b, a plurality of radiation elements corresponding to respective frequency bands is attached to the frame formed of synthetic resin. The ground sheets 253a and 253b are formed of an aluminum foil. The antennas 251a and 251b are disposed to be positioned on the upper side when the display casing 13 is opened as shown in FIG. 1, in order to improve the antenna's radio wave sensitivity.

Figure 4:
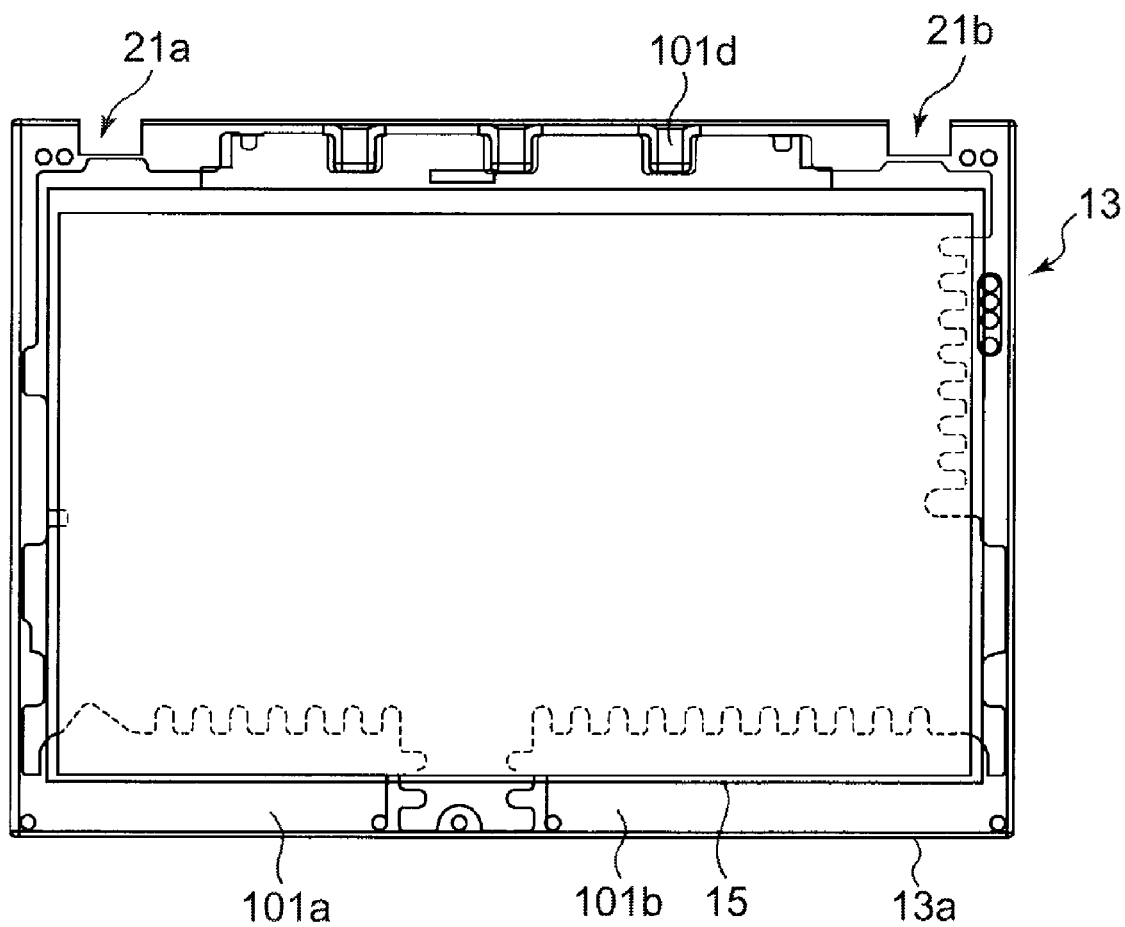
FIG. 4 is a top plan view illustrating a state where the LCD module is accommodated in the display casing.

FIG. 4 is a top plan view according to at least one embodiment of the present invention illustrating a state where the LCD module 15 is accommodated in the display casing 13. As is clear from FIGS. 3 and 4, the antenna regions 101a and 101b are configured to extend a sufficient distance toward the central part from the sidewalls 13a so that the whole body of each antenna 251a and 251b can be mounted thereon. As a result, joint portions of the antenna regions 101a and 101b and the CFRP region 103 are in a projection area of the LCD module 15 with respect to the bottom surface. Since the whole body of each antenna 251a and 251b can be arranged within the antenna regions 101a and 101b formed of a nonconductive material, it is possible to obtain a good radio wave characteristic. Specifically, the antennas 251a and 251b are arranged such that the radiation element portions 255a and 255b are disposed between inner surfaces of the sidewalls 13a of the display casing 13 and the LCD module 15, and most parts of the ground sheets 253a and 253b are disposed between the LCD module 15 and the antenna regions 101a and 101b.

Here, a description of a joint structure between the GFRP region 101 and the CFRP region 103 will be described. The GFRP region 101 and the CFRP region 103 need to form a single body to secure strength of the display casing 13 such as by holding the LCD module 15 or enduring an external pressing force. Therefore, the joint portions require a predetermined strength. As illustrated in FIG. 2, the joint portions of the GFRP region 101 and the CFRP region 103 include butt joint portions 201a to 201c depicting regular waveforms in the bottom surface and lap joint portions 201d and 201e shown by straight lines. The lap joint portions 201d and 201e are only illustrations, and all joint portions of the GFRP region 101 and the CFRP region 103 other than the butt joint portions 201a to 201c are lap joined, that is, in an overlapping manner.

In the lap joint portions 201d and 201e, the GFRP region 101 is lap joined over the CFRP region 103 so that it bulges toward the inner side of the display casing 13. In the butt joint portions 201a to 201c, an end portion of the GFRP region 101 and an end portion of the CFRP region 103 are butt joined at contacting surfaces depicting regular corrugated curves such as waveforms in the bottom surface. Although the lap joining can provide higher strength than the butt joining, the lap joining is applied only to areas disposed outside the projection area of the LCD module 15 with respect to the bottom surface because the lap joint portions become thicker at the inner side. Alternatively, a method of the lap joining such that the GFRP region 101 bulges toward the outer side of the display casing 13 at the lap joint portions may be considered; however, such a method may not be applied because of designing problems.

In accordance with at least one presently preferred embodiment of the invention, the thickness of the CFRP region 103 is about 1.5 mm and the thickness of the antenna region 101a is about 1 mm to 1.5 mm. The CFRP region 103 is produced by cutting a laminated panel having an expanded layer sandwiched between two CFRP layers into the shape of the CFRP region 103 as shown in FIG. 2. By applying such a laminated panel to the central portion where it is necessary to increase the strength of the display casing 13, it is possible to produce the display casing 13 as being lightweight and having increased strength. Then, the display casing 13 is formed by injection molding in which the processed CFRP panel 103 is set on a metallic mold and a GFRP heated to be melt is press-fitted to the metallic mold.

Figure 5A:
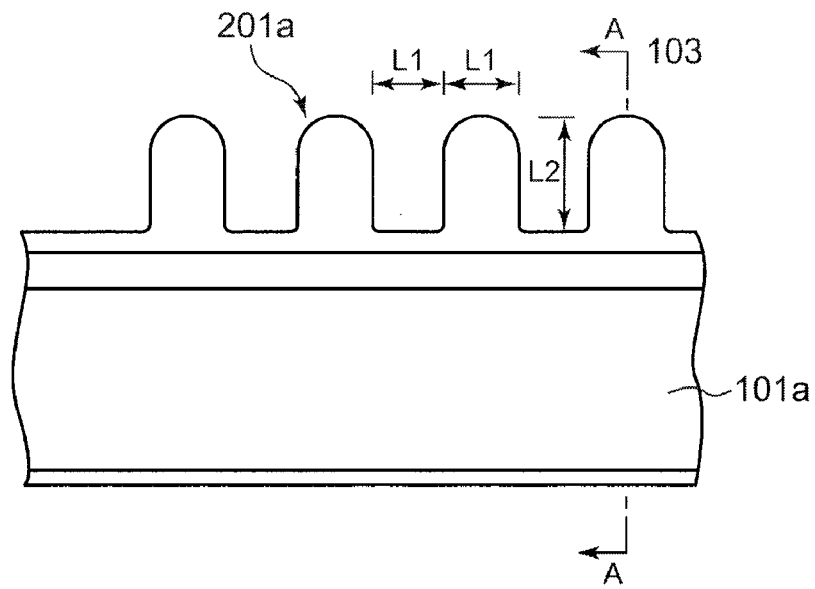
FIGS. 5 (A-C) are a top plan view and cross-sectional views illustrating a detailed structure of a joint portion.
Figure 5B:
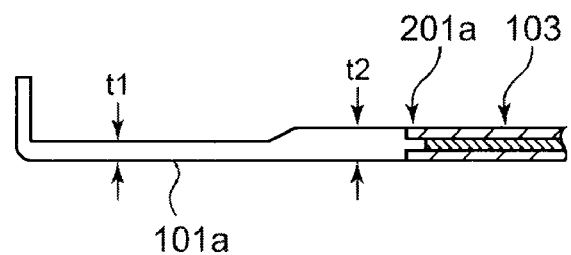
Figure 5C:
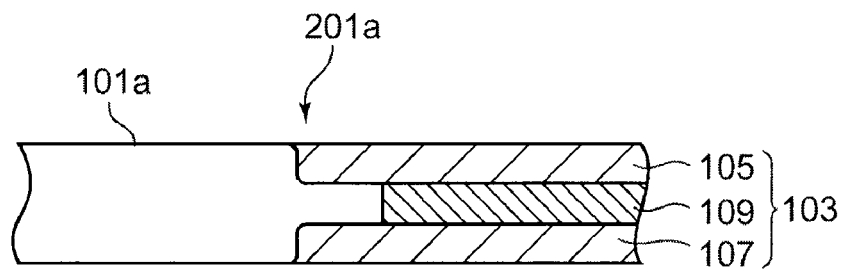

FIG. 5A is a top plan view according to at least one embodiment of the present invention illustrating a detailed structure of the antenna region 101a and the joint portion 201a. FIG. 5B is a cross-sectional view according to at least one embodiment taken along the arrows A-A in FIG. 5A, and FIG. 5C is an enlarged cross-sectional view according to at least one embodiment of the joint portion 201a. In FIG. 5B, a thickness t1 of a principal surface constituting the antenna region 101a is set to 1 mm; however, a thickness t2 thereof in the vicinity of a joint surface with the CFRP region 103 is set to 1.5 mm, which thickness is the same as the thickness of the CFRP region 103.

The antenna regions 101a and 101b are coupled with the camera region 103a by means of butt joining, so that it is possible to secure sufficient strength. Since the radiation element portion 255a of the antenna 251a can be arranged in a thin (thickness t1) part of the antenna region 101a, a space for the radiation element portion 255a of the antenna 251a can be provided in the thickness direction of the display casing 13, easing restrictions on an antenna design and thus obtaining a good antenna characteristic. Further, by allowing the antenna regions 101a and 101b to be thin, it is possible to achieve a light weight of the display casing 13.

In the joint portion 201a, an end portion of the antenna region 101a and an end portion of the CFRP region 103 are contacted each other in a curved surface depicting a regular corrugated line and having a width L1 of about 6 mm and a length L2 of about 7 mm as viewed in top plan view. The contacting surface may have other shapes as long as it can increase the size of contacting areas of two materials to thus increase the coupling strength. Since the CFRP region 103 has a laminated structure having the expanded layer 109 inserted between the CFRP layers 105 and 107, the GFRP melt in the process of the injection molding can partially come into the expanded layer 109, and thus, both of them can be firmly joined to each other as illustrated in FIG. 5C.

Referring to FIGS. 2 and 4, the joint portions 201*a* to 203*d* are in an orthographic projection area of the LCD module 15 with respect to the bottom surface and are thus hidden thereunder, but the joint portions 201*d* and 201*e* are positioned outside the orthographic projection area of the LCD module 15. Therefore, even when the joint portions 201*d* and 201*e* are lap joined with the GFRP region 101 at the inside of the CFRP layer 105, there is no problem in mounting the LCD module 15.

Since the joining between the camera region 103*a* and portions of the GFRP region 101 in the vicinity of the sidewalls 13*a* can be carried out by lap joining, it is possible to secure the strength of the camera region 103*a*. Moreover, by applying butt joining to the camera region 103*a* having increased strength, it is possible to secure the strength of the antenna regions 101*a* and 101*b*. In the joint portions 201*a* to 201*c*, butt joining is carried out, thus providing a flat mounting surface for the LCD module 15 to the bottom surface. Moreover, the outer surface of the display casing 13 is coated with paint so that the joint portions 201*a* to 201*e* are invisible from the outside.

While the present invention has been shown and described by way of particular preferred embodiments in conjunction with the drawings, the present invention is not limited to the disclosed embodiments. It is to be understood that the present invention may employ any configurations known in the art as long as they can attain the effects of the present invention, for example the present invention can be used in an electronic apparatus such as a portable computer or a mobile phone.

If not otherwise stated herein, it is to be assumed that all patents, patent applications, patent publications and other publications (including web-based publications) mentioned and/or cited herein are hereby fully incorporated by reference herein as if set forth fully in their entirety herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. An apparatus comprising:
 a casing structure, said casing structure comprising:
  a sidewall; and
  a bottom surface, said bottom surface comprising:
   a conductive resin region end portion; and
   a nonconductive resin region end portion;
   wherein the conductive resin region end portion and the nonconductive resin region end portion are butt-joined to form a joint portion.

2. The apparatus according to claim 1, wherein the joint portion depicts a curved line in the bottom surface, said curved line comprising a regular corrugated line.

3. The apparatus according to claim 2, wherein a conductive resin region pitch is the same as a nonconductive resin region pitch in the joint portion.

4. The apparatus according to claim 1, wherein the conductive resin region comprises a carbon fiber reinforced plastic.

5. The apparatus according to claim 1, wherein the nonconductive resin region comprises a glass fiber reinforced plastic.

6. The apparatus according to claim 3, wherein the conductive resin region further comprises a laminated panel, said laminated panel having an expanded layer disposed between layers made of carbon fiber reinforced plastic.

7. The apparatus according to claim 6, wherein the casing structure is formed by fixing the laminated panel, which has been cut into a predetermined shape, to a metallic mold and then flowing the molten glass fiber reinforced plastic into the metallic mold.

8. The apparatus according to claim 7, wherein the sidewall and a peripheral portion of the bottom surface are formed of nonconductive resin.

9. The apparatus according to claim 1, wherein the nonconductive resin region further comprises an antenna mounting space.

10. The apparatus according to claim 9, wherein the antenna mounting space has a thickness smaller than both a joint portion thickness and a conductive resin region thickness.

11. The apparatus according to claim 2, wherein the casing structure further comprises a display casing accommodating a display module, wherein the nonconductive resin region does not lower sensitivity of an antenna disposed within said casing structure.

12. The apparatus according to claim 10,
 wherein the joint portion is formed in a projection area of the display module with respect to the bottom surface; and
 wherein the conductive resin region and the nonconductive resin region are lap joined with each other at positions outside the projection area of the display module.

13. An apparatus comprising:
 a casing structure, said casing structure comprising:
  a display casing, the display casing comprising:
   a sidewall;
   a bottom surface, said bottom surface comprising:
    a radio wave conductive resin region; and
    a non radio wave conductive resin region;
    wherein an end portion of the conductive resin region and an end portion of the nonconductive resin region are butt-joined to form a joint portion; and
   a display module.

14. The apparatus according to claim 13,
 wherein the joint portion depicts a curved line in the bottom surface, said curved line comprising a regular corrugated line; and
 wherein a conductive resin region pitch is the same as a nonconductive resin region pitch in the joint portion.

15. The apparatus according to claim 14, wherein the conductive resin region comprises a carbon fiber reinforced plastic and the nonconductive resin region comprises a glass fiber reinforced plastic.

16. The apparatus according to claim 15, wherein the conductive resin region further comprises a laminated panel, said laminated panel having an expanded layer disposed between layers made of carbon fiber reinforced plastic.

17. The apparatus according to claim 16, wherein the sidewall and a peripheral portion of the bottom surface are formed of nonconductive resin.

18. The apparatus according to claim 17, wherein the nonconductive resin region further comprises an antenna mounting space, said antenna mounting space having a thickness smaller than both a joint portion thickness and a conductive resin region thickness.

19. The apparatus according to claim 18,
wherein the joint portion is formed in a projection area of the display module with respect to the bottom surface; and
wherein the conductive resin region and the nonconductive resin region are lap joined with each other at positions outside the projection area of the display module.

* * * * *